United States Patent
Chen et al.

(12)

(10) Patent No.: US 7,965,394 B2
(45) Date of Patent: Jun. 21, 2011

(54) METHOD AND APPARATUS FOR IDENTIFYING DYNAMIC CHARACTERISTICS OF A VIBRATORY OBJECT

(75) Inventors: Liang-Chia Chen, Taipei County (TW); Chung-Chu Chang, Taipei (TW); Yao-Ting Huang, Taipei (TW); Jin-Liang Chen, Hsinchu (TW)

(73) Assignees: Industrial Technology Research Institute, Hsinchu (TW); National Taipei University of Technology, Taipei (TW)

( * ) Notice: Subject to any disclaimer, the term of this patent is extended or adjusted under 35 U.S.C. 154(b) by 228 days.

(21) Appl. No.: 12/165,890

(22) Filed: Jul. 1, 2008

(65) Prior Publication Data

US 2009/0180124 A1    Jul. 16, 2009

(30) Foreign Application Priority Data

Jan. 11, 2008  (TW) ............................... 97101106 A

(51) Int. Cl.
    *G01B 11/02* (2006.01)
(52) U.S. Cl. ...................................... 356/511

(58) Field of Classification Search .......... 356/496–498, 356/502, 511, 516
    See application file for complete search history.

(56) References Cited

U.S. PATENT DOCUMENTS

| 5,841,030 | A  | * | 11/1998 | Honsberg et al. | ............... 73/579 |
| 6,219,145 | B1 | * | 4/2001  | Gutierrez et al. | ............ 356/498 |
| 7,782,466 | B2 | * | 8/2010  | Chen et al.     | ..................... 356/498 |
| 2005/0007599 | A1 | * | 1/2005  | deGroot     | ....................... 356/511 |
| 2005/0157306 | A1 | * | 7/2005  | Schmit et al. | .................. 356/495 |
| 2005/0279172 | A1 | * | 12/2005 | Schreier et al. | ................. 73/657 |

* cited by examiner

*Primary Examiner* — Tarifur Chowdhury
*Assistant Examiner* — Jonathan M Hansen
(74) *Attorney, Agent, or Firm* — WPAT, PC; Justin King

(57) ABSTRACT

A method and apparatus for identifying dynamic characteristics of a vibratory object is provided in the present invention, in which a series of dynamic interference images of the vibratory object is acquired through a frequency sweeping procedure and a two-dimensional image scanning procedure. Thereafter, the acquired images are processed for obtaining the corresponding differential fringe density index by signal processing technique of band-pass filtering method so as to further identify the dynamic characteristics of the vibratory object.

15 Claims, 11 Drawing Sheets

METHOD AND APPARATUS FOR IDENTIFYING DYNAMIC CHARACTERISTICS OF A VIBRATORY OBJECT

FIELD OF THE INVENTION

The present invention relates to an identification method and apparatus, and more particularly, to a method and apparatus capable of using a frequency scanning and image processing procedures for identifying dynamic characteristics of a vibratory object.

BACKGROUND OF THE INVENTION

Conventional surface topography interferometric microscopes for profiling the surface of a microstructure with respect to an X-axis, a Y-axis and a Z-axis of a Cartesian coordinate system are static measurement means that can be adapted for various applications, including: for measuring the surface roughness and flatness of a wafer, for measuring depth of a lease mark, for measuring coplanar as well as the size of the stud bump in a flip chip process, for measuring the size and height of spacers in a color filter of an LCD flat panel display, for measuring the surface profile of the endface of an optical fiber as well as that of a micro-optical element, and so forth. Recently, there are efforts trying to improve the conventional static surface topography interferometric microscope with dynamic measuring capability so that it is possible to use the aforesaid interference microscope with dynamic measuring capability in micro electromechanical system (MEMS) and micro optical electronic mechanical system (MOEMS) for inspecting an measuring the dynamic of devices and membranes.

The aforesaid efforts usually achieve the dynamic measurement by attaching a driving source with a fixed excitation frequency onto a working sample and the same time connecting a synchronization device to its light source for synchronizing the frequency of the light source with that of the driving source in a manner that a resonance frequency can be obtained manually by altering the frequency of a synchronization signal. However, For those wide-band driving source such as a micro cantilever submerged in water which is resonating by the affection of flowing water for enabling the micro cantilever driving source to emit a wide-band signal, they are not suitable for dynamic measurement since it is difficult to control the resonance of the driving source.

The most common vibration measurement is the vibration analysis performed by the use of a Laser Doppler Velocimetry (LDV). However, it is only useful for single-point measurement in a manner that when it is required to measure a two-dimensional vibration, a step-scan mode is adopted for scanning every single point of a mechanical structure in a point-by-point manner and thus acquiring the vibration mode thereof. As the aforesaid method is not only time consuming, but also can be easily affected by ambient environment during the measurement, it is unable to obtain the surface profile relating to a complete vibration mode in a real time manner.

Taking the Polytec vibrometer MSA400 for example which is an improvement over the Mach-Zehnder interferometer, it is composed of a laser Doppler module, a white light interference module for static 3D profilometry and a strobed light displacement measuring module, and so on. For performing an out-of-plane displacement measurement, the MSA400 first utilizes its embedded software to mark optimal sampling points to be sampled as well as map out the optimal sampling path accordingly in advance in the area that is to be inspected, and thereafter uses its laser Doppler module to scan and analyze each and every sampling points within a specific frequency range for obtaining resonance frequencies in respective. As from each sampling point, it is able to obtain a corresponding resonance frequency set. Thus, by integrating those resonance frequency sets, a 3D profile of an out-of-plane displacement can be established. The aforesaid method of using a laser beam to scan a surface in a point-by-point manner is unique and patented by Polytec. However, as the aforesaid method is not a full-field measurement, it is unable to detect the defects that only affect on certain MEMS devices when they are resonating. Nevertheless, the aforesaid method is advantageous in its high band width that it can be adapted for inspecting an object as large as an automobile, or as small as a MEMS device.

Studying currently available technical reports and documents relating to 3D profiling method and system, it is noted that there are problems required to be solved which are: (1) although the laser Doppler scanning is able to provide sufficient identification in wide-band resonance frequency detection, the laser energy that it is used for detection is possible to cause damage to a micro device which it is inspecting; (2) as laser source is usually very expensive and requires complex optical path that is not easy to establish, it is difficult to apply the aforesaid laser Doppler scanning in common microscopic system.

SUMMARY OF THE INVENTION

The object of the present invention is to provide a method and apparatus for identifying dynamic characteristics of a vibratory object, in which a series of dynamic interference images of the vibratory object is first acquired through a frequency sweeping procedure and a two-dimensional image scanning procedure, and then the acquired images are processed for obtaining the corresponding fringe density index so as to further identify the dynamic characteristics of the vibratory object.

In an exemplary embodiment of the invention, the present invention provides a method for identifying dynamic characteristics of a vibratory object, which comprises the steps of: (a) defining a scan frequency range while setting a series of scan frequencies within the scan frequency range; (b) acquiring an interferogram of the vibratory object by the use of a scanning procedure; (c) performing an image processing procedure upon the acquired interferogram so as to form a processed image; (d) estimating the spatial frequency domain of the processed image for obtaining and thus recording a fringe density index; (e) altering the scan frequency while repeating the steps from (b) to (e) if the altered scan frequency falls in the defined scan frequency range; otherwise, directing the method to proceed to step (f); and (f) analyzing the fringe density index so as to obtain a dynamic characteristic of the vibratory object.

In another exemplary embodiment of the invention, the present invention provides an apparatus for identifying dynamic characteristics of a vibratory object, which comprises: a center control; a synchronization control, coupled to the center control and capable of utilizing a control signal for correspondingly and synchronously generating a first control signal and a second control signal; a light-emitting unit, for receiving the first control signal to generate a strobed light in a manner that it is controlled by the synchronization control to change the phase of the strobed light; an imaging unit, for receiving the second control signal and correspondingly capturing an interferogram of the vibratory object while transmitting the captured interferogram to the center control; and a carrier, for carrying the vibratory object and correspondingly adjusting the position of the vibratory object.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as follows.

Figure 1:
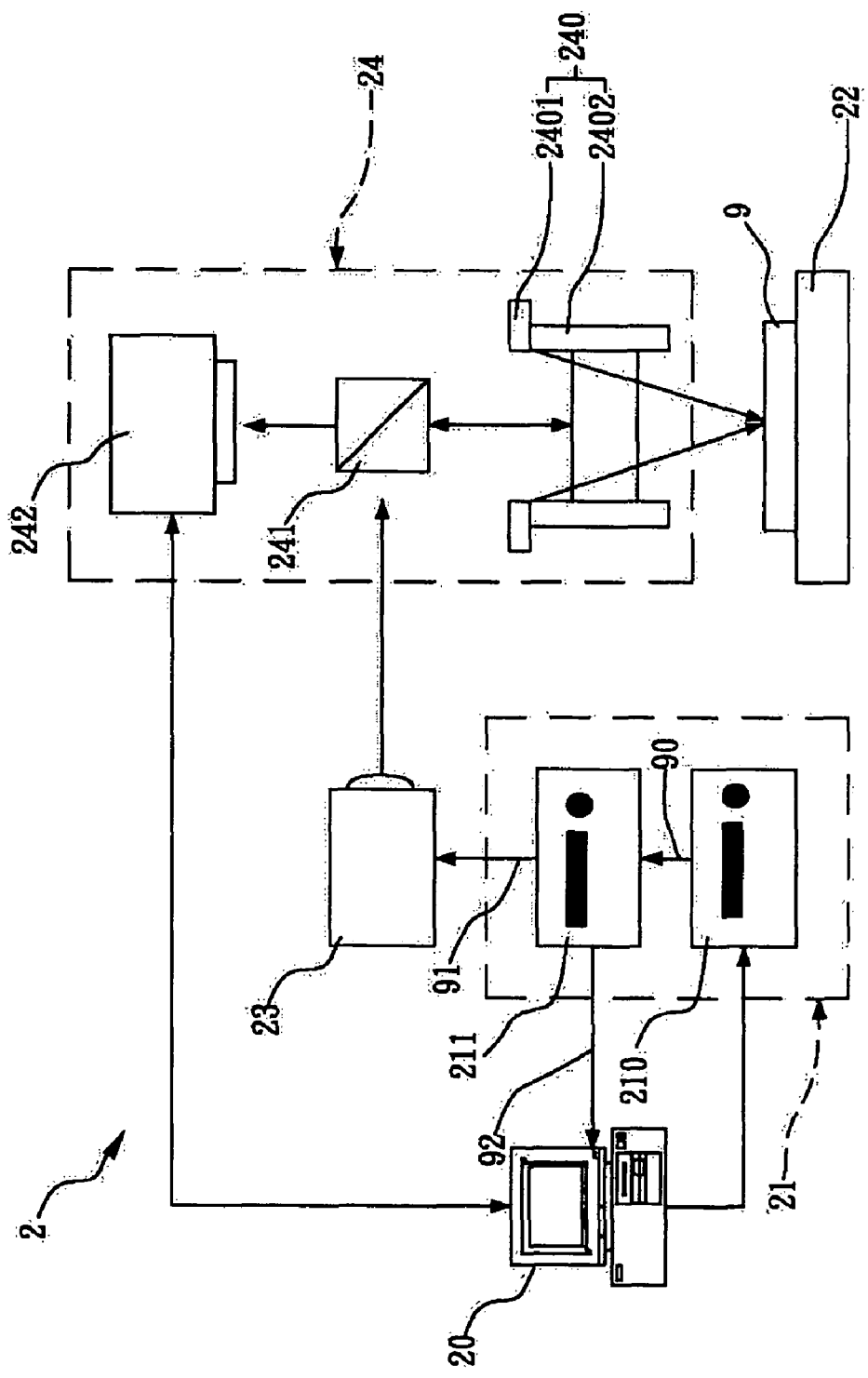
FIG. 1 is a schematic diagram showing an apparatus for identifying dynamic characteristics of a vibratory object.

FIG. 1 is a schematic diagram showing an apparatus for identifying dynamic characteristics of a vibratory object. The identifying apparatus 2 comprises a center control 20, a synchronization control 21, a light-emitting unit 23, an imaging unit 24 and a carrier 22. The center control 20 is substantially a calculation device with data processing ability, such as a computer or a workstation, that it is able to control the synchronization control 21 and the imaging unit 24 by the software embedded therein. The synchronization control 21, being coupled to the center control 20, is able to utilize a control signal 90 for correspondingly generating a first control signal 91 and a second control signal 92 in a manner that the two are synchronized with the control signal 90. In this embodiment, the synchronization control 21 is composed of a wave generator 210 and a synchronization controller 211, in which the wave generator 210 is able to respond to a request of the center control 20 so as to generate the control signal 90 while the control signal 90 can be a pulse, a sinusoidal wave, or a square wave.

The light-emitting unit 23, being coupled to the synchronization control 21, is configured to receive the first control 91 so as to generate a strobed light accordingly. In this embodiment, the light-emitting unit 23 can be a light emitting diode or other light sources of equivalent capability. Comparing with those using conventional light source, the light emitting diode is not going to damage the vibratory object by overheating since the energy it is emitting is comparatively less. In addition, the strobed light emitting unit 23 is suitable to be configured in common interferometric microscopic system. Thereby, the laser source commonly adopted by those conventional devices using Doppler detection, not only the manufacture cost can be reduced greatly, but also the complexity of the instrument is simplified.

The imaging unit 24, also being coupled to the center control 20, is configured to receive the second control signal 92 through the center control 20 for controlling the imaging unit 24 to capture an image of the vibratory object 9 while transmitting the captured image to the center control 20. In this embodiment, the vibratory object 9 is an autonomous vibrating object that it can vibrate by itself or its own excitation unit without being attached to any external vibrator. The imaging unit 24 includes a lens set 240, a beam splitter 241 and a charge-coupled device (CCD) 242. The lens set 240 is configured with a driver 2401 for controlling an interference object lens 2402 to scan the vibratory object 9 vertically. The beam splitter 241 is configured to receive the strobed light in a manner that the strobed light is guided to the lens set 240 and then projected on the vibratory object 9 so as to be reflected thereby back to the beam splitter 241 for forming interferometric fringes. Thereafter, the interferometric fringes of the vibratory object 9 is captured by the CCD 242 to form an interferogram which is then being fed to the center control 20 for analysis. The carrier 22 is used for carrying the vibratory object 9 and correspondingly adjusting the position of the same. In this embodiment, the adjustment of the position of the vibratory object 9 is to control the distance between the vibratory object 9 and the imaging unit 24.

Figure 2A:
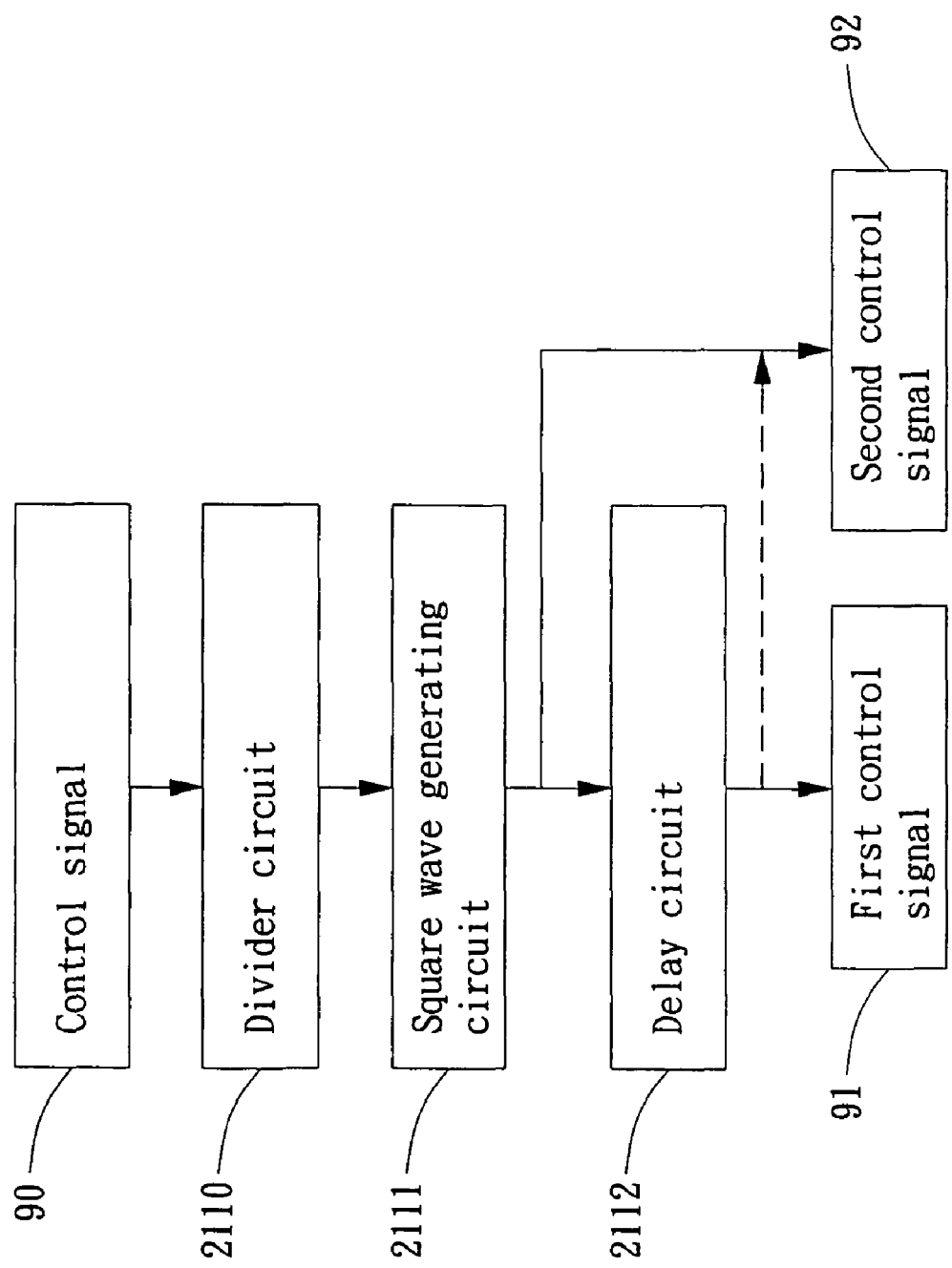
FIG. 2A and FIG. 2B show a synchronization control according to a first embodiment of the invention.
Figure 2B:
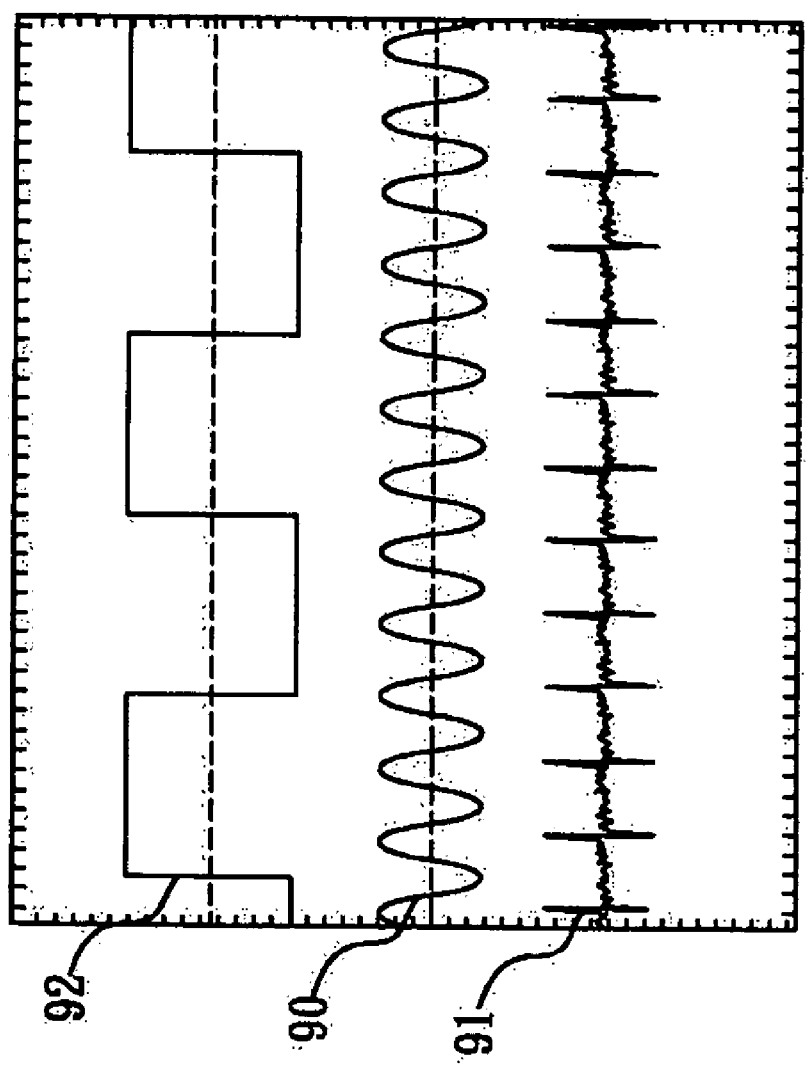

The synchronization control mechanism of the invention is achieved by a frequency control signal which is first being sent to a synchronization control system for enabling the same to issue a control signal to those devices with slower working frequency so as to synchronize the operation of each device controlled thereby. Please refer to FIG. 2A and FIG. 2B, which show a synchronization control according to a first embodiment of the invention. In this embodiment, a control signal 90 is used as a triggering source for generating synchronization signals. As soon as the synchronization controller 211 receives the control signal 90 generated from the wave generator 210, the divider circuit 2110 of the synchronization controller will generate a divider signal to the square wave generating circuit 2111 for enabling the same to form a square wave signal, and then the square wave signal is delayed by the delay circuit 2112 to form a delay signal, so that the delay signal and the square wave signal are processed in an calculation for forming the first control signal 91. The second control signal 92 can be selectively to be form either by the delay circuit 2112 or by the square wave generating circuit 2111.

Figure 3:
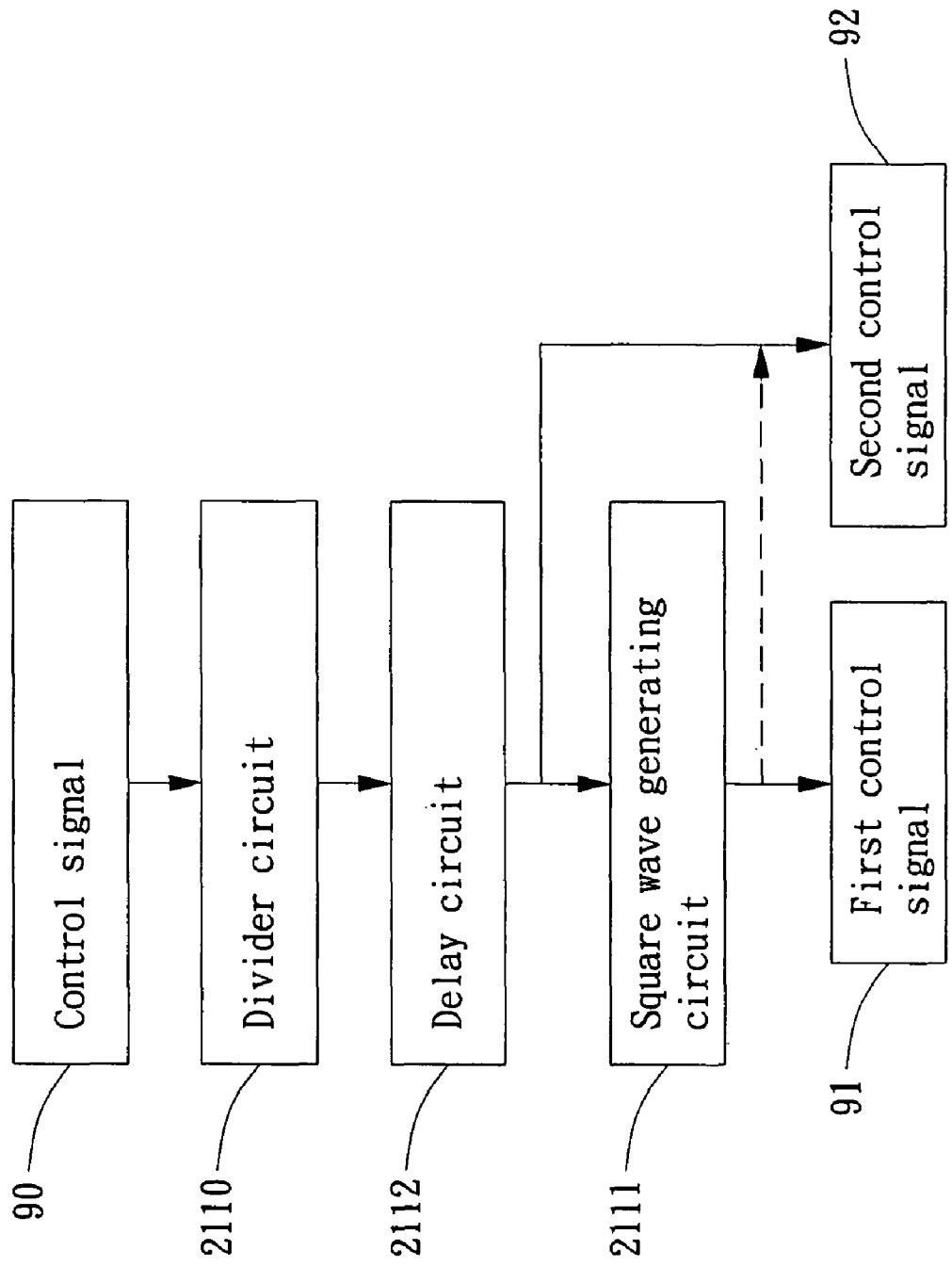
FIG. 3 shows another synchronization control according to a second embodiment of the invention.

Please refer to FIG. 3, which shows another synchronization control according to a second embodiment of the invention. In this embodiment, the activation of the delay circuit 2112 prior to that of the square wave generating circuit 2111, by that the square wave generating circuit 2111 will receive the divider signal from the divider circuit 2110 and the delay signal from the delay circuit 2112 while converting these two into square waves to be used in an calculation for forming the second control signal 92. In addition, a third control signal can be selectively to be form either by the delay circuit 2112 or by the square wave generating circuit 2111.

Figure 4:
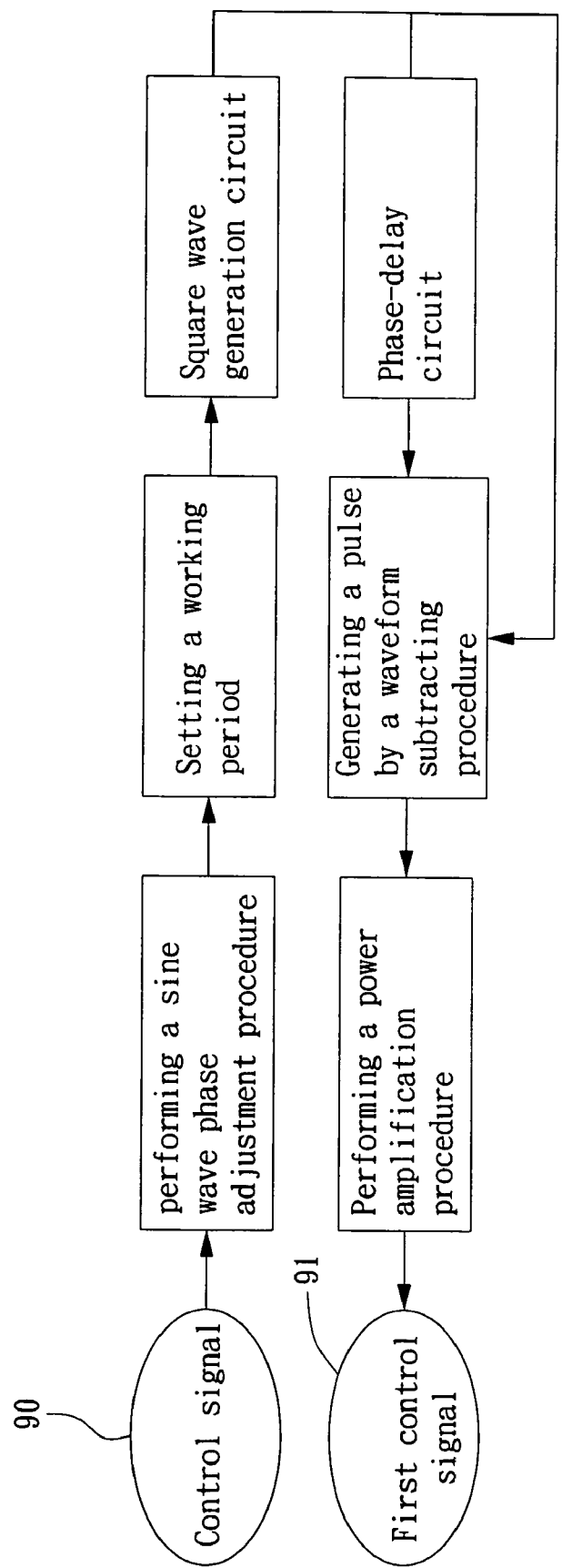
FIG. 4 is a flow chart showing steps used for forming a second control signal of the invention.

Please refer to FIG. 4, which is a flow chart showing steps used for forming a second control signal of the invention. As shown in FIG. 4, the control signal 90 is first subjected to a sine wave phase adjustment procedure in the synchronization controller 211, and then being subjected to a working period setting procedure, and after that it is fed into the square wave generating circuit 2111 for forming a square wave to be received by the delay circuit 2112 so that a pulse can be generated by performing a waveform subtracting procedure upon the delay wave and the original square wave. Thereafter, the pulse is subjected to a power amplification procedure so as to form the second control signal 92 to be used for controlling the light-emitting unit 23.

Figure 5:
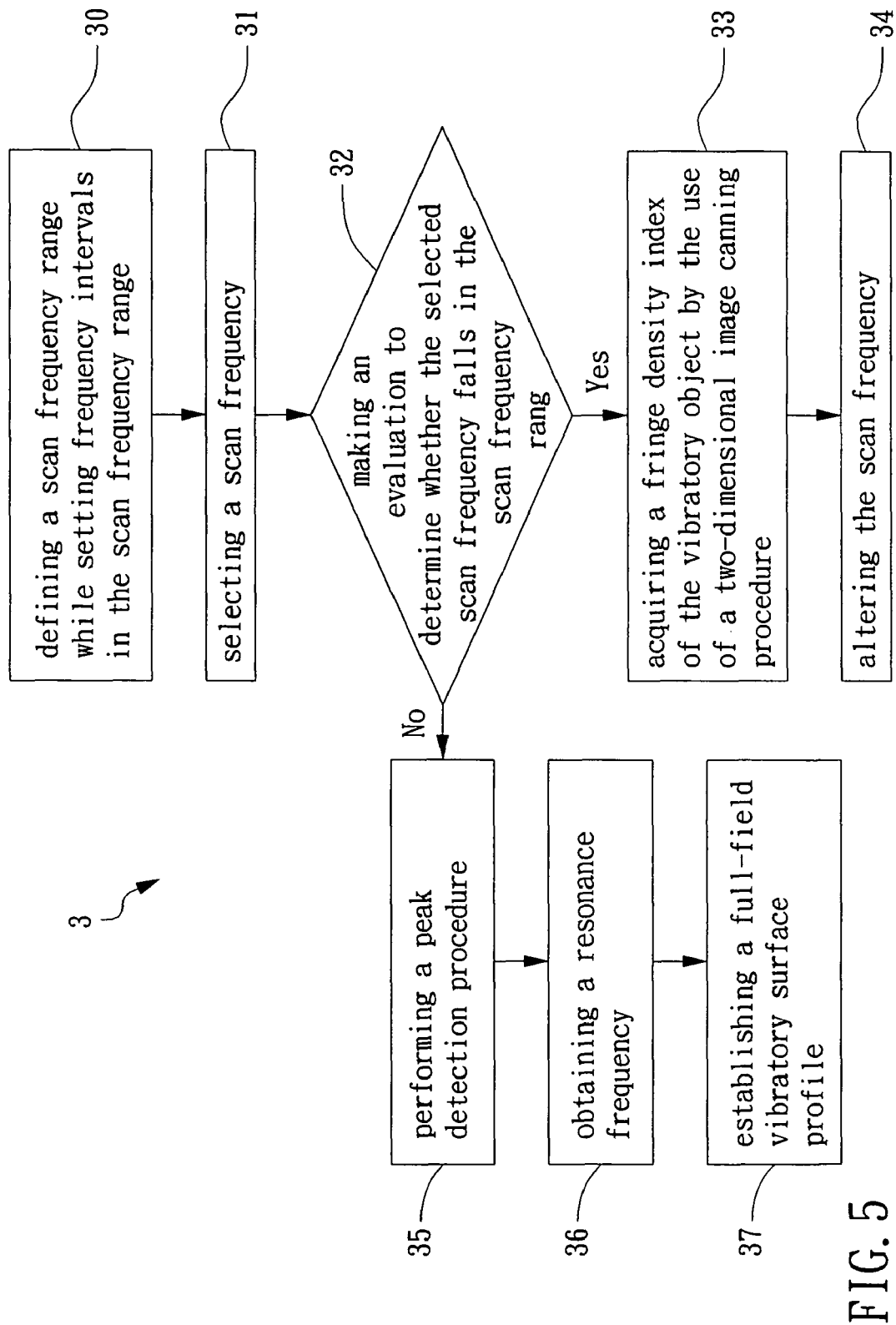
FIG. 5 is a flow chart showing steps of a method for identifying dynamic characteristics of a vibratory object according to an exemplary embodiment of the invention.

Please refer to FIG. 5, which is a flow chart showing steps of a method for identifying dynamic characteristics of a vibratory object according to an exemplary embodiment of the invention. The refereeing dynamic characteristic can be the periodic or non-periodic vibrating frequency of a vibratory object, or its resonance frequency, but is not limited thereby. It is noted that as the amplitude of the vibratory object is larger when it is resonating and thus causing its corresponding fringes to be more densely distributed, a band-pass filtering method can be adopted for identifying the resonance frequency of the vibratory object, and moreover, the identifying of the resonance frequency can be achieved by an image processing technique so that the time spent in the detection of the resonance frequency is effective reduced and the identification of the same is enhanced. In this embodiment, the dynamic characteristic is the vibrating frequency of a vibratory object. The method of FIG. 5 starts from step 30. At step 30, a scan frequency range is defined while setting frequency intervals in the scan frequency range, and then the flow proceeds to step 31. It is noted that the scan frequency is defined by the center control 20 in a manner that the range and interval of the frequency scanning is designed according to the dynamic characteristic of the vibratory object. After the range and interval setting is completed, a scanning process can be initiated that is started from step 31 where an initial scanning frequency is selected from the frequency range. At step 31, the center control 20 direct the wave generator 210 to transmit the control signal generated to the synchronization controller 211 where the synchronization controller 211 is enabled to send a synchronized first control signal 90, being a pulse signal in this embodiment, to the light-emitting unit and the second control signal 92 to the imaging card embedded in the center control 20, by which the imaging card can be activated to capture images of the vibratory object while the light-emitting unit, after receiving the pulse signal, is activated to emit a strobed light to the imaging unit 24 in which the strobed light is guided to the lens set 240 by the beam splitter 241 and then projected on the vibratory object 9, and then the flow proceeds to step 32.

Figure 6:
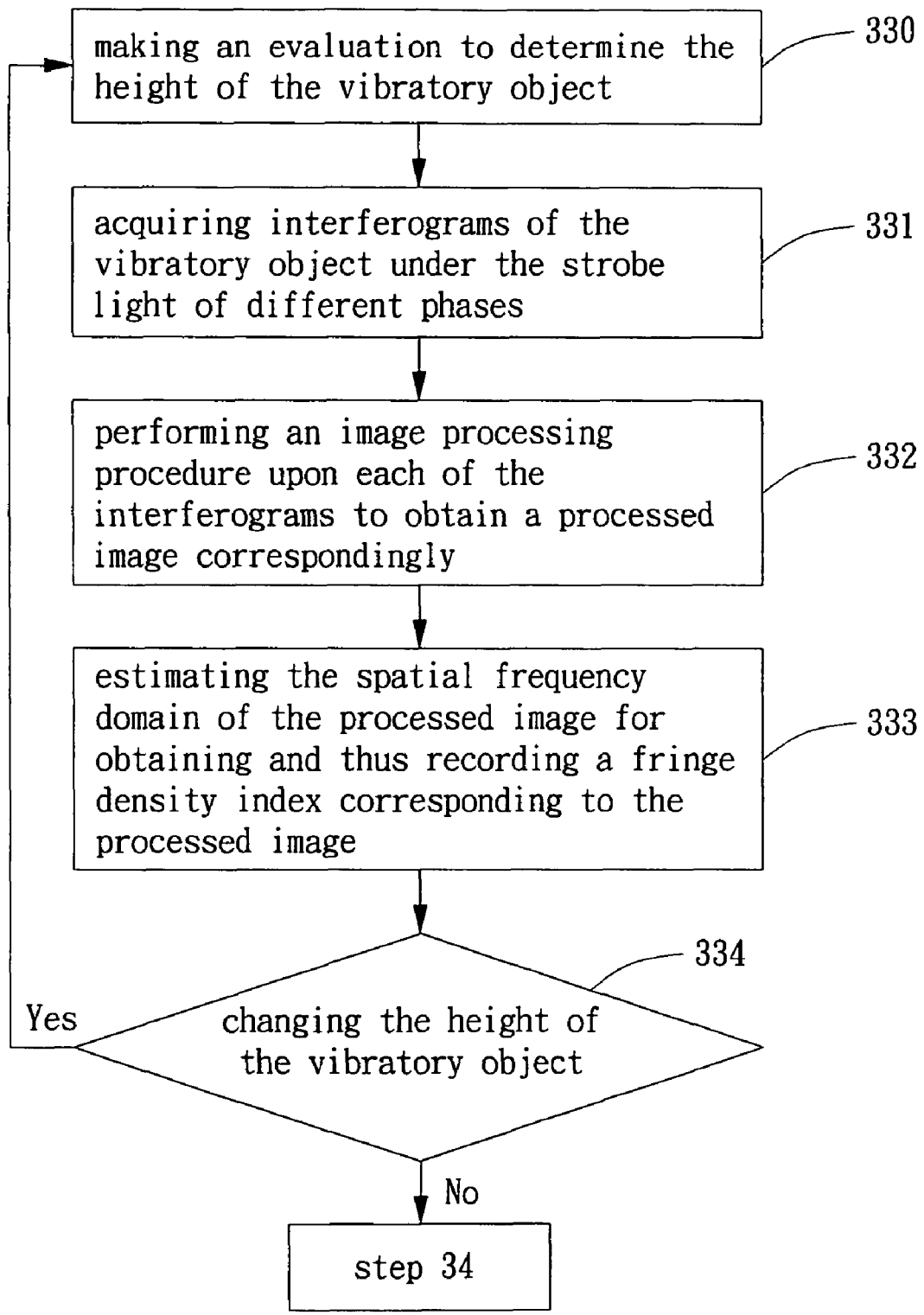
FIG. 6 is a flow chart showing steps of a two-dimensional image scanning procedure used in the present invention.

At step 32, an evaluation is made to determine whether the selected scan frequency falls in the scan frequency range; if so, the flow proceeds to step 33; otherwise, the flow is directed to step 35. At step 33, a fringe density index of the vibratory object is acquired by the use of a two-dimensional image scanning procedure. Please refer to FIG. 6, which is a flow chart showing steps of a two-dimensional image scanning procedure used in the present invention. In the embodiment shown in FIG. 6, the flow starts from step 330. At step 330, the height of the vibratory object is determined, i.e. by the use of the carrier 22, the position of vibratory object 9 is adjusted in a manner that the distance between the vibratory object 9 and the imaging unit 24 is adjusted; and then the flow proceeds to step 331. At step 331, interferograms of the vibratory object 9 are captured under the strobed light of different phases; and then the flow proceeds to step 332. The reasoning for step 331 is that: since even the vibratory object is fixed at a specific position, its vibration amplitude might be changing with time so that the step 331 is intended to capture a series of interferograms relating to the vibratory object through the phase changing of the strobed light.

At step 332, an image processing procedure is performed upon each of the interferograms to obtain a processed image correspondingly; and then the flow proceeds to step 333. The objective of step 332 is to acquire frequency information relating to the density of the fringes captured in the interferogram, so that the noise in the interferogram should be first filtered and then the contrast of the fringes in the interferogram can be effectively enhanced. In general, the gray level of a pixel of the interferogram can be critically influenced by unstable light intensity of the strobed light source and becomes fluctuated. Thus, it is preferred to normalize those pixel values for enhancing the contrast of the fringes locating within the interferogram, and thereby, errors resulting from the brightness difference between different images induced by fluctuating light intensity can be minimized and consequently the problem relating to unstable focal function can be avoided.

At step 333, the spatial frequency domain of the processed image is estimated for obtaining a fringe density index corresponding to the processed image; and then the flow proceeds to step 334. In the step 333, the means used for estimating the spatial frequency domain of the processed image is a spatial frequency distribution law of fringe identification, by which the fringe density index corresponding to the processed image can be obtained whereas the so-called fringe density index is related to an numerical operation performed upon pixel values in the processed image, such as the clarity or contrast of the processed image.

The measurement on the fringe density variance of the stroboscopic interferogram images can provide an effective and fast detection of the resonant peaks and the identification of the corresponding vibration modes. The fringe density variance is directly associated with the image contrast changes since the spatial frequency of the fringes affects the degree of image contrast. Image contrast functions are evaluated on the assumptions that images increase in contrast as focus improves. The change in contrast can be described mathematically by the magnitude of the high frequencies or gradients; standard deviation of pixel intensity; or autocorrelation. In this embodiment, a means of multi-coefficient correlation is adopted as the law for obtaining the fringe density index, which can be a F4 or F5 algorithm of the Vollath's autocorrelation function. The present embodiment uses the F4 algorithm of the Vollath's autocorrelation function, as the equation (1) shown in the following, to obtain the fringe density index of a specific vibrating frequency, by which the higher the percentage of high frequency in the interferogram is, the more obvious the resonance of the vibratory object will be and thus the larger the fringe density index.

$$F_f = \sum_{x=1}^{M-1}\sum_{y=1}^{N-1} I(x, y) \times I(x+1, y) - \sum_{x=1}^{M-2}\sum_{y=1}^{N} I(x, y) \times I(x+2, y) \quad (1)$$

wherein
- I(x, y) represents the gray level of the pixel (x, y) in the interferogram;
- (M, N) is the size of the interferogram.

In addition to the aforesaid means of multi-coefficient correlation, it is possible to use a means of image differentiation for obtaining the fringe density index, such as threshold absolute gradient, squared gradient, etc.; or a means of depth of peaks and valleys, such as image threshold content, image power, image contrast including variance, normalized variance, histogram, histogram range, entropy, an so on; or frequency-domain analysis such as Laplacian algorithm; or other effective spatial frequency domain identification law for obtaining the fringe density index.

Moreover, since the intensity of the strobed light could be influenced by the excitation frequency and the pulsed light duration, it may not kept as a constant during the scanning process. The detection of accurate resonant modes could be influenced by the fact that the above fringe density measure may not determined based on a constant lighting situation. In order to address the issue, a more robust detection index by evaluating a differential fringe density index between the neighboring scanning frequencies, can be expressed as follows:

$$\Delta F = (F_{f_1} - F_{f_2})^2 \quad (2)$$

where
- $F_{f_1}$ is the value of the fringe density measure when the vibration excitation frequency is $f_1$;
- $F_{f_2}$ is the value of the fringe density measure when the vibration excitation frequency is $f_1 + \Delta f$;
- $\Delta f$ is the scanning frequency pitch.

Figure 7:
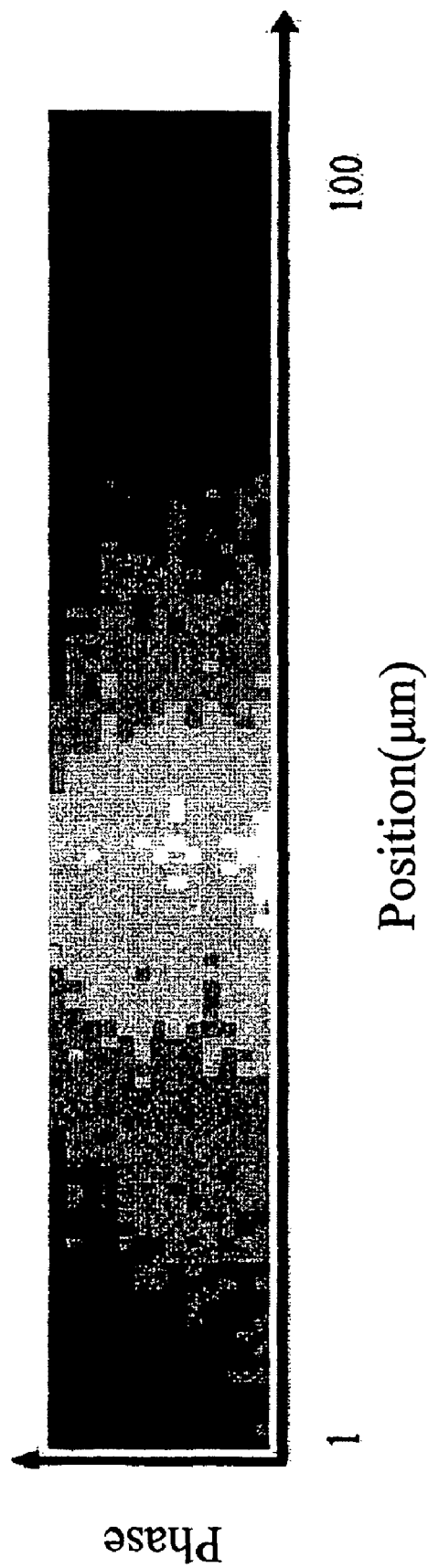
FIG. 7 and FIG. 8 show a distribution of the differential fringe density index under a specific frequency.
Figure 8:
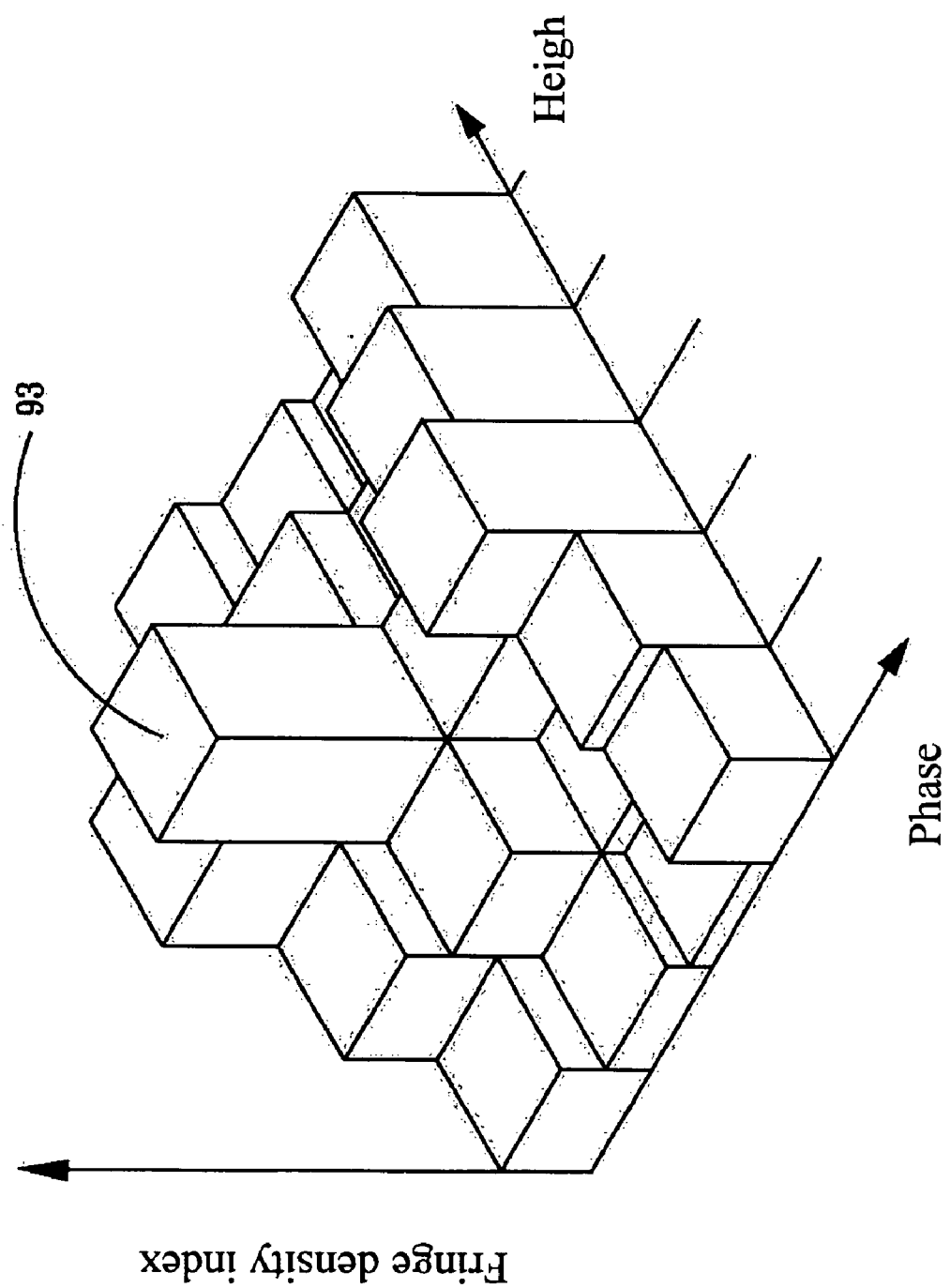
Figure 9:
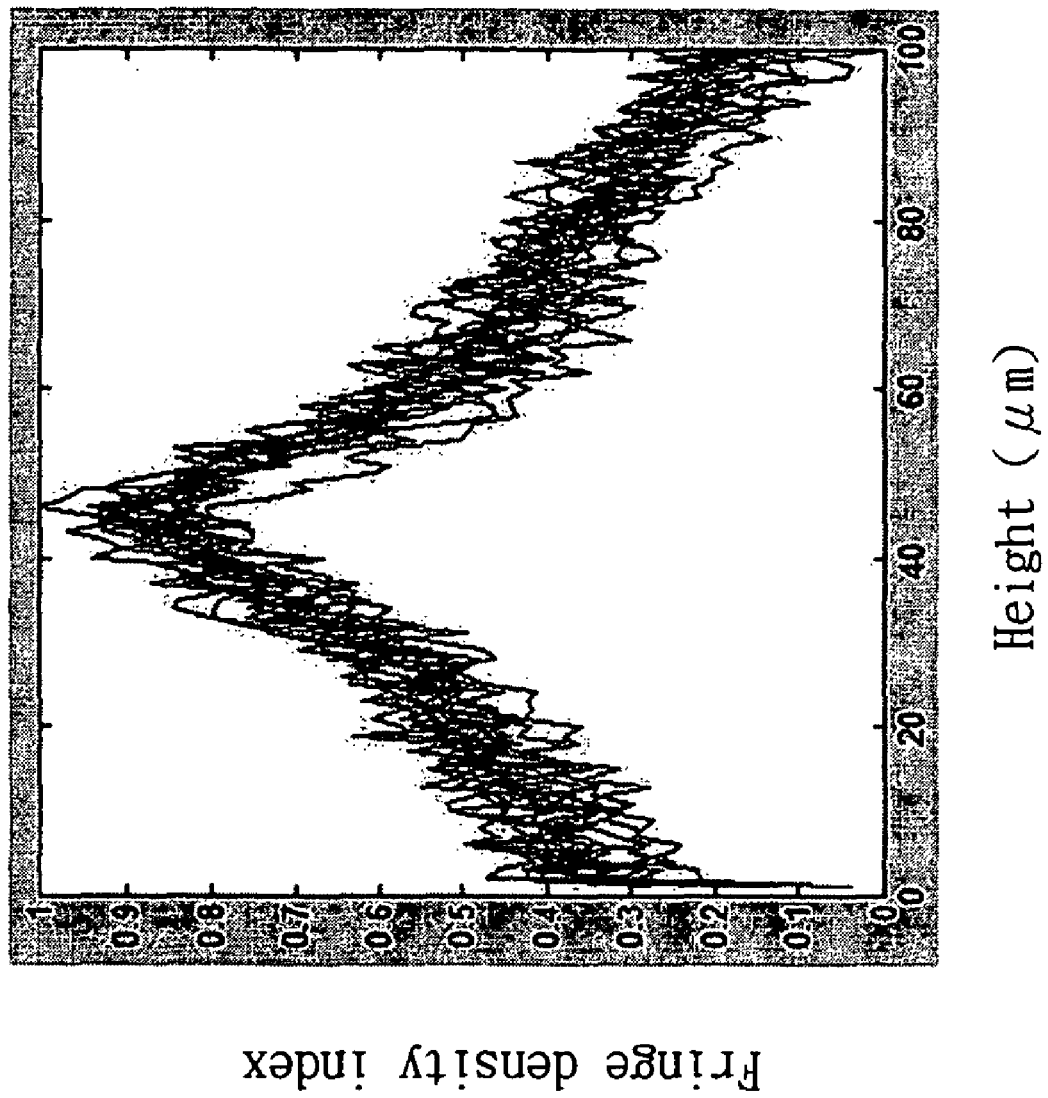
FIG. 9 profiles the relationship between the differential fringe density index and the height of the vibratory object.

After the differential fringe density index is obtained and recorded, the flow proceeds to step 334 where the height of the vibratory object is altered while subjecting the altered height to an evaluation to determine whether the height is within the scanning range, if not, then the flow proceeds to step 34, otherwise, the flow proceeds back to repeat step 330 to step 334 until all the differential fringe density indexes relating to the complete combination of phases of the strobed light and the heights of the vibratory object are obtained. That is, by performing one cycle of step 330 to step 334, all the differential fringe density indexes relating to the complete combination of phases of the strobed light and the heights of the vibratory object under one scanning frequency are obtained; and then the flow can proceed with another scanning frequency. In addition, by defining the aforesaid phases of the strobed light and the heights of the vibratory object as the X-axis and the Y-axis of a Cartesian coordinate system, the distribution spectrum of the differential fringe density index detected from one scanning frequency can be represented as that shown in FIG. 7. Moreover, by defining the so-obtained differential fringe density index corresponding to each set of the phase and height as the Z-axis, the plotting of FIG. 7 can be shown as the 3D diagram of FIG. 8, in which each set of phase and height is correlated to its distinct differential fringe density index. Thereby, at the same scanning frequency, the differential fringe density index of maximum value can be located in FIG. 8, i.e. the one marked by number 93 in FIG. 8. Thereby, by projecting the differential fringe density indexes on a plane established by the height and the fringe density index, a spectrum profiling the relationship between the differential fringe density index and the height of the vibratory object can be obtained, as the one shown in FIG. 9.

Figure 10:
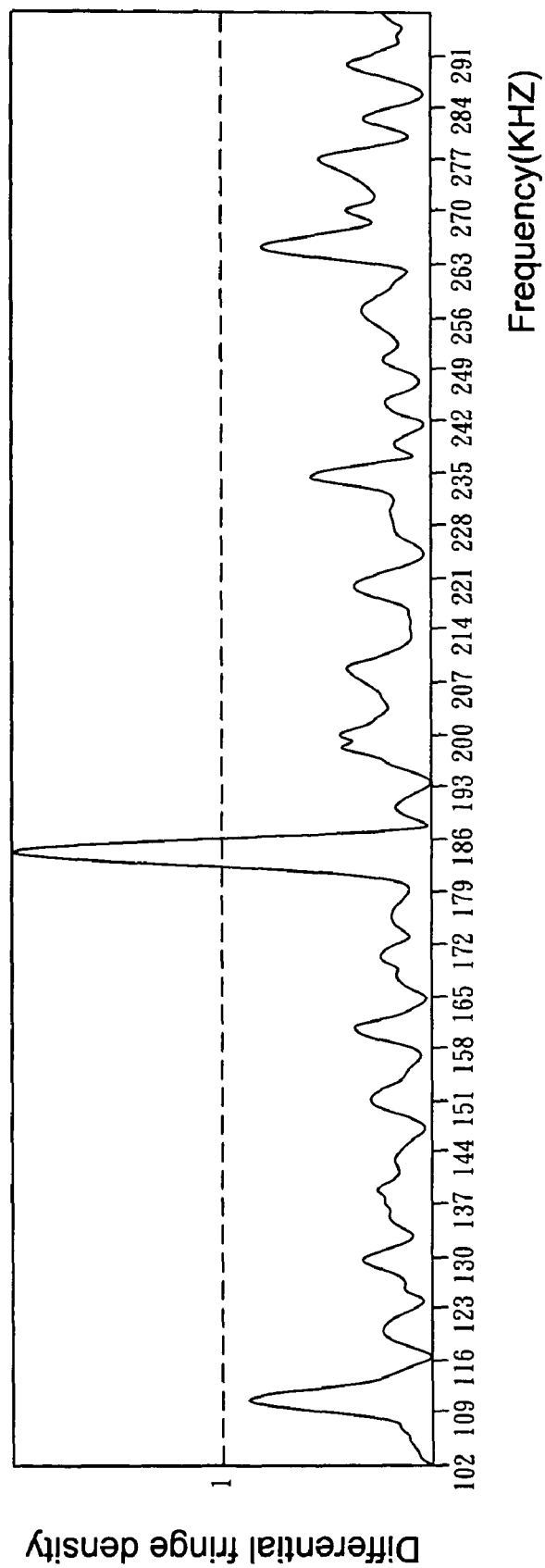
FIG. 10 profiles the relationship between the differential fringe density index and the scan frequency.

Back to FIG. 5, the flow proceeds to step 34 after the step 33 is completed. At step 34, the scanning frequency is altered; and then the flow proceeds back to step 32 for evaluating whether the newly selected scan frequency falls in the scan frequency range; if so, the flow proceeds to step 33 and then step 34, by which another maximum fringe density index relating to the newly selected scanning frequency can be obtained. The flow repeats the aforesaid steps until all the scanning frequencies are tested and thus a plot of the characteristic curve depicting the relationship between the maximum differential fringe density indexes and their corresponding scanning frequencies can be established as the one shown in FIG. 10. Thereafter, the flow proceeds to step 35. At step 35, a peak detection procedure is performed, which includes a band-pass filtering and peak detection, for finding a peak in the characteristic curve by a means of band-pass filtering. After the peak is located, the flow proceeds to step 36. At step 36, a resonance frequency of the vibratory object is calculated and thus obtained; and then the flow proceeds to step 37. In the embodiment shown in FIG. 10, the periodic vibrating frequency of the vibratory object is identified as 184 KHz by the use of the peak detection and frequency calculation performed in step 35 and step 36.

At step 37, a full-field vibratory surface profile is established by the use of full-field rebuild means. The aforesaid full-field rebuild means is performed utilizing the imaging unit cooperating with the strobed light-emitting unit, which can be a means selected from the group consisting of: a phase-shift interferometry (PSI), and a vertical scanning interferometry (VSI).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for identifying dynamic characteristics of a vibratory object, comprising the steps of:
   (a) defining a scan frequency range while setting a series of scan frequencies within the scan frequency range;
   (b) acquiring a differential fringe density index of the vibratory object by the use of a two-dimensional image scanning procedure, wherein the step (b) further comprises the steps of:
      (b1) making an evaluation to determine the height of the vibratory object;
      (b2) acquiring an interferogram of the vibratory object under strobed light of different phases;
      (b3) performing an image processing procedure upon the interferogram to obtain a processed image correspondingly;
      (b4) estimating the spatial frequency domain of the processed image for obtaining and thus recording a differential fringe density index corresponding to the processed image; and
      (b5) changing the height of the vibratory object and thereafter repeating the step (b2) to step (b5);
   (c) altering the scan frequency while repeating the steps from (b) to (c) if the altered scan frequency falls in the defined scan frequency range; otherwise, directing the method to proceed to step (d); and
   (d) analyzing the differential fringe density index through peak detection so as to obtain a dynamic characteristic of the vibratory object;
   wherein the differential fringe density index is a difference of two fringe density indexes respectively corresponding to the two neighboring scanning frequencies, and the fringe density index is related to an numerical operation performed upon pixel values in the processed image, such as the clarity or contrast of the processed image.

2. The method of claim 1, wherein the image processing procedure further comprises the steps of:
   filtering out noises in the interferogram; and
   enhancing contrast of the fringes in the interferogram.

3. The method of claim 1, wherein the means used for estimating the spatial frequency domain of the processed image is a spatial frequency distribution law of fringe identification.

4. The method of claim 3, wherein the spatial frequency distribution of fringe identification is selected from a group consisting of: a multi-coefficient correlation, an image differentiation, a depth of peaks and valleys, an image contrast, a histogram, and a frequency-domain analysis.

5. The method of claim 1, further comprises the step of:
   (e) using a full-field reconstructing means to establish a full-field vibratory surface profile for the vibratory object of a resonance frequency.

6. The method of claim 5, wherein the full-field reconstructing means is a means selected from the group consisting of: a phase-shift interferometry (PSI), and a vertical scanning interferometry (VSI).

7. The method of claim 1, wherein the analyzing of the differential fringe density index further comprises the steps of: a procedure of peak detection and a procedure of band-pass filtering.

8. The method of claim 1, wherein the dynamic characteristic is a resonance frequency of the vibratory object.

9. An apparatus for identifying dynamic characteristics of a vibratory object, comprising:
   a center control for performing a two-dimensional image scanning procedure and defining a scan frequency range while setting a series of scan frequencies within the scan frequency range;
   a synchronization control, coupled to the center control and capable of utilizing a control signal for correspondingly generating a first control signal and a second control signal in a manner that the two are synchronized with the control signal;
   a light-emitting unit, for receiving the first control signal to generate a strobed light in a manner that it is controlled by the synchronization control to change the phase of the strobed light;
   an imaging unit, for receiving the second control signal and correspondingly capturing a plurality of interferograms of the vibratory object during the two-dimensional image scanning procedure while transmitting the captured interferograms to the center control; and
   a carrier, for carrying the vibratory object and correspondingly adjusting the position of the vibratory object;
   wherein the center control acquires a differential fringe density index of the vibratory object by the use of a two-dimensional image scanning procedure, in which the center control further makes an evaluation to determine the height of the vibratory object, acquires the interferogram of the vibratory object under strobed light of different phases, performs an image processing procedure upon the interferogram to obtain a processed image correspondingly, estimates the spatial frequency domain of the processed image for obtaining and thus recording a differential fringe density index corresponding to the processed image, and changes the height of the vibratory object so as to obtain the differential fringe density index of the vibratory object for each interferogram, and finally analyzes the differential fringe density index through peak detection so as to obtain a dynamic characteristic of the vibratory object, wherein the differential fringe density index is a difference of two fringe density indexes respectively corresponding to the two neighboring scanning frequencies, and the fringe density index is related to an numerical operation performed upon pixel values in the processed image, such as the clarity or contrast of the processed image.

10. The apparatus of claim 9, wherein the synchronization control further comprises:
   a divider circuit, for receiving the control signal and thus generating a divider signal accordingly;
   a delay circuit, for receiving and processing the divider signal to generating a delay signal accordingly; and
   a square wave generating circuit, for receiving the divider signal and the delay signal while converting the two into square waves to be used in an calculation for forming the first control signal.

11. The apparatus of claim 10, wherein the second control signal is generated by a device selected from the group consisting of: the delay circuit and the square wave generating circuit.

12. The apparatus of claim 9, wherein the synchronization control further comprises:
   a divider circuit, for receiving the control signal and thus generating a divider signal accordingly;
   a square wave generating circuit, for receiving the divider signal and thus generating a square wave signal accordingly; and
   a delay circuit, for delaying the square wave signal to form a delay signal while performing a calculation upon the delay signal along with the square wave signal so as to form the first control signal.

13. The apparatus of claim 12, wherein the second control signal is generated by a device selected from the group consisting of: the delay circuit and the square wave generating circuit.

14. The apparatus of claim 9, wherein the control signal is a signal selected from the group consisting of: a pulse, a sinusoidal wave, and a square wave.

15. The apparatus of claim 9, wherein the light-emitting unit is a light emitting diode.

* * * * *